(12) United States Patent
Ito et al.

(10) Patent No.: US 7,438,598 B1
(45) Date of Patent: Oct. 21, 2008

(54) CARD CONNECTOR

(75) Inventors: Toshiyasu Ito, Togane (JP); Masaaki Oya, Yokohama (JP); Kazutaka Taguchi, Asaka (JP); Takashi Torii, Osaka (JP); Hideki Kawai, Nara (JP)

(73) Assignees: Yamaichi Electronics Co., Ltd., Tokyo (JP); Matsushita Electric Industrial Co., Ltd., Tokyo (JP)

( * ) Notice: Subject to any disclaimer, the term of this patent is extended or adjusted under 35 U.S.C. 154(b) by 0 days.

(21) Appl. No.: 09/869,784

(22) PCT Filed: Nov. 2, 2000

(86) PCT No.: PCT/JP00/07762

§ 371 (c)(1),
(2), (4) Date: Oct. 16, 2001

(87) PCT Pub. No.: WO01/35333

PCT Pub. Date: May 17, 2001

(30) Foreign Application Priority Data

Nov. 5, 1999 (JP) .................................. 11-316110
Nov. 12, 1999 (JP) .................................. 11-323187

(51) Int. Cl.
*H01R 24/00* (2006.01)
(52) U.S. Cl. ........................ 439/630; 439/218
(58) Field of Classification Search ............... 439/630, 439/217, 218, 222, 64, 541.5, 152–160, 377
See application file for complete search history.

(56) References Cited

U.S. PATENT DOCUMENTS

| 1,477,527 | A | 12/1923 | Raettig |
| 3,040,291 | A | 6/1962 | Schweitzer et al. |
| 3,470,522 | A | 9/1969 | Lawrence |
| 3,530,422 | A | 9/1970 | Goodman |
| 3,601,774 | A | 8/1971 | Stathos et al. |

(Continued)

FOREIGN PATENT DOCUMENTS

DE    3937383 A1    6/1990

(Continued)

OTHER PUBLICATIONS

U.S. Appl. No. 09/703,669, filed Nov. 2, 2000, T. Ito et al.

(Continued)

*Primary Examiner*—Felix O. Figueroa
(74) *Attorney, Agent, or Firm*—Finnegan, Henderson, Farabow, Garrett & Dunner, LLP

(57) ABSTRACT

The connector housing 30 is formed with a pair of guide grooves 50a, 50b and a pair of side walls 60. The guide grooves 50a, 50b support the both side edges of the upper body portion 21 of the thick first card 20 and also the both side edges of the card body 11 of the thin second card 10 and guide these cards as they are inserted or extracted. The side walls 60 define, below a space between the paired guide grooves 50a, 50b, a space in which to accommodate the lower body portion 23 of the first card 20. This construction ensures that, whichever of the first and second cards is inserted, the elastic displacements of the contact terminals 40 of a card connector 1 remain the same, allowing the card to be electrically connected stably.

31 Claims, 14 Drawing Sheets

U.S. PATENT DOCUMENTS

| | | | |
|---|---|---|---|
| 3,631,381 A | 12/1971 | Pittman | |
| 3,671,917 A | 6/1972 | Ammon et al. | |
| 3,823,367 A | 7/1974 | Kaye et al. | |
| 3,932,016 A | 1/1976 | Ammenheuser | |
| 3,963,293 A | 6/1976 | McKee | |
| 4,017,143 A | 4/1977 | Knowles | |
| 4,077,694 A | 3/1978 | Cobaugh et al. | |
| 4,184,735 A | 1/1980 | Ammon et al. | |
| 4,220,382 A | 9/1980 | Ritchie et al. | |
| 4,274,699 A | 6/1981 | Keim | |
| 4,392,705 A | 7/1983 | Andrews, Jr. et al. | |
| 4,404,464 A | 9/1983 | Moreno | |
| 4,421,372 A | 12/1983 | Golden | |
| 4,507,697 A | 3/1985 | Ozil et al. | |
| 4,722,693 A | 2/1988 | Rose | |
| 4,734,041 A | 3/1988 | Bruchmann et al. | |
| 4,780,603 A | 10/1988 | Hamada | |
| 4,850,899 A | 7/1989 | Maynard | |
| 4,864,116 A | 9/1989 | Banjo et al. | |
| 5,035,633 A | 7/1991 | Kobayashi et al. | |
| 5,036,430 A | 7/1991 | Hills | |
| 5,080,613 A | 1/1992 | Orui et al. | |
| 5,179,504 A | 1/1993 | Kitahara | |
| 5,198,645 A | 3/1993 | Martin et al. | |
| 5,207,598 A | 5/1993 | Yamada et al. | |
| 5,281,178 A | 1/1994 | Biscorner | |
| 5,300,763 A | 4/1994 | Ito et al. | |
| 5,320,552 A | 6/1994 | Reichardt et al. | |
| 5,374,198 A | 12/1994 | Nagata | |
| 5,401,185 A | 3/1995 | Wang et al. | |
| 5,490,791 A * | 2/1996 | Yamada et al. | 439/159 |
| 5,518,986 A | 5/1996 | Winston | |
| 5,563,397 A | 10/1996 | Fujimoto et al. | |
| 5,581,127 A | 12/1996 | Shinohara | |
| 5,634,819 A | 6/1997 | Pan et al. | |
| 5,668,365 A | 9/1997 | Ito et al. | |
| 5,716,221 A | 2/1998 | Kantner | |
| 5,725,385 A | 3/1998 | Takano et al. | |
| 5,872,353 A | 2/1999 | Reichardt et al. | |
| 5,876,218 A | 3/1999 | Liebenow et al. | |
| 5,904,597 A | 5/1999 | Doi et al. | |
| 5,928,027 A | 7/1999 | Kunishi | |
| 5,933,328 A | 8/1999 | Wallace et al. | |
| 5,993,261 A | 11/1999 | Klatt et al. | |
| 6,004,155 A | 12/1999 | Wu | |
| 6,036,548 A | 3/2000 | Braithwaite | |
| 6,056,573 A | 5/2000 | Nishioka | |
| 6,068,500 A | 5/2000 | Kantner | |
| 6,089,919 A | 7/2000 | Nishioka | |
| 6,099,335 A | 8/2000 | Chang | |
| 6,102,715 A | 8/2000 | Centofante | |
| 6,109,940 A | 8/2000 | Chad et al. | |
| 6,123,557 A | 9/2000 | Wang et al. | |
| 6,126,486 A | 10/2000 | Chang | |
| 6,129,571 A | 10/2000 | Ikemoto | |
| 6,129,572 A | 10/2000 | Feldman et al. | |
| 6,135,809 A * | 10/2000 | Asakawa | 439/489 |
| 6,162,075 A | 12/2000 | Hara et al. | |
| 6,162,089 A | 12/2000 | Costello et al. | |
| 6,174,089 B1 | 12/2000 | Costello et al. | |
| 6,174,198 B1 | 1/2001 | Wu et al. | |
| 6,176,737 B1 | 1/2001 | Choy | |
| 6,183,292 B1 | 2/2001 | Chen et al. | |
| 6,203,378 B1 | 3/2001 | Shobara et al. | |
| 6,213,785 B1 | 4/2001 | Nishio et al. | |
| 6,224,391 B1 | 5/2001 | Horie et al. | |
| 6,231,360 B1 * | 5/2001 | Horie | 439/159 |
| 6,234,845 B1 * | 5/2001 | Hakozaki | 439/633 |
| 6,250,965 B1 * | 6/2001 | Neifer | 439/630 |
| 6,250,966 B1 | 6/2001 | Hashimoto et al. | |
| 6,261,128 B1 | 7/2001 | Heim et al. | |
| 6,315,615 B1 | 11/2001 | Raistrick | |
| 6,315,621 B1 | 11/2001 | Natori et al. | |
| 6,328,605 B1 | 12/2001 | Walker et al. | |
| 6,345,760 B1 | 2/2002 | Eason et al. | |
| 6,361,369 B1 | 3/2002 | Kondo et al. | |
| 6,386,920 B1 * | 5/2002 | Sun | 439/630 |
| 6,399,906 B1 | 6/2002 | Sato et al. | |
| 6,402,529 B2 * | 6/2002 | Saito et al. | 439/630 |
| 6,409,546 B1 * | 6/2002 | Ito et al. | 439/630 |
| 6,457,647 B1 | 10/2002 | Kurihashi et al. | |
| 6,468,101 B2 | 10/2002 | Suzuki | |
| 6,482,029 B2 | 11/2002 | Nishimura | |
| 6,503,092 B1 * | 1/2003 | Sato | 439/159 |
| 6,508,661 B1 | 1/2003 | Yu | |
| 6,511,349 B2 | 1/2003 | Ishikawa et al. | |
| 6,511,350 B1 * | 1/2003 | Ito et al. | 439/680 |
| 6,524,137 B1 | 2/2003 | Liu et al. | |
| 6,527,590 B2 * | 3/2003 | Oguchi | 439/630 |
| 6,601,766 B2 | 8/2003 | Nakagawa et al. | |
| 6,612,492 B1 | 9/2003 | Yen | |
| 6,641,413 B2 | 11/2003 | Kurodu | |
| 6,666,724 B1 | 12/2003 | Lwee | |
| 6,699,053 B2 | 3/2004 | Kuroda | |
| 6,700,788 B2 | 3/2004 | Matsushita et al. | |
| 6,716,066 B1 | 4/2004 | Kuo | |
| 6,780,062 B2 | 8/2004 | Liu et al. | |
| 6,783,399 B2 | 8/2004 | Joung | |
| 2003/0157839 A1 | 8/2003 | Yamaguchi et al. | |
| 2004/0026507 A1 | 2/2004 | Nagata et al. | |
| 2004/0106326 A1 | 6/2004 | Hsieh | |
| 2004/0110423 A1 | 6/2004 | Shishikura et al. | |

FOREIGN PATENT DOCUMENTS

| | | |
|---|---|---|
| DE | 4 139 482 | 6/1993 |
| EP | 0 284 431 A2 | 9/1988 |
| EP | 0 696 008 | 2/1996 |
| EP | 1 487 001 | 9/1997 |
| EP | 0936705 A2 | 8/1999 |
| EP | 0939582 A2 | 9/1999 |
| EP | 1 146 474 | 10/2001 |
| EP | 1 324 256 | 7/2003 |
| JP | 49-059071 | 6/1974 |
| JP | 1-168978 | 11/1989 |
| JP | 01-320713 | 12/1989 |
| JP | 2-187887 | 7/1990 |
| JP | 03-241620 | 10/1991 |
| JP | 04-8618 | 3/1992 |
| JP | 04-249082 | 9/1992 |
| JP | 5-502746 | 5/1993 |
| JP | 05-502746 | 5/1993 |
| JP | 06-036834 | 2/1994 |
| JP | 06-044052 | 2/1994 |
| JP | 6-44052 | 2/1994 |
| JP | 6-162281 | 6/1994 |
| JP | 06-162281 | 6/1994 |
| JP | 06-77178 | 10/1994 |
| JP | 07153524 | 6/1995 |
| JP | 07-335321 | 12/1995 |
| JP | 08-235981 | 9/1996 |
| JP | 08-236187 | 9/1996 |
| JP | 8-315081 | 11/1996 |
| JP | 09-027367 | 1/1997 |
| JP | 09007694 | 1/1997 |
| JP | 10-21348 | 1/1998 |
| JP | 10091729 | 4/1998 |
| JP | 2784346 | 5/1998 |
| JP | 10-187896 | 7/1998 |
| JP | 10240871 | 9/1998 |
| JP | 11-53503 | 2/1999 |
| JP | 11-053503 | 2/1999 |
| JP | 11-111402 | 4/1999 |
| JP | 11-316110 | 11/1999 |

| | | |
|---|---|---|
| JP | 2000-502490 | 2/2000 |
| JP | 2000-277200 | 6/2000 |
| JP | 2000-243499 | 9/2000 |
| JP | 2000-251024 | 9/2000 |
| JP | 2000-251025 | 9/2000 |
| JP | 2001-135385 | 5/2001 |
| JP | 2002-164124 | 6/2002 |
| JP | 2002-289295 | 10/2002 |
| JP | 2003-288962 | 10/2003 |
| JP | 2004-95234 | 3/2004 |
| JP | 2004-193111 | 7/2004 |
| JP | 2005-011666 | 1/2005 |
| JP | 2005-135696 | 5/2005 |

OTHER PUBLICATIONS

U.S. Appl. No. 09/703,682, filed Nov. 2, 2000, T. Ito et al.
U.S. Appl. No. 09/705,747, filed Nov. 6, 2000, T. Ito et al.
U.S. Appl. No. 09/890,637, filed Oct. 12, 2001, K. Abe et al.
English Abstract of DE 4 139 482.
English Abstract of EP 0 696 008.
English Abstract of JP 01-320713.
English Abstract of JP 03-241620.
English Abstract of JP 04-249082.
English Abstract of JP 04-008618.
English Abstract of JP 06-036834.
English Abstract of JP 06-077178.
English Abstract of JP 07-335321.
English Abstract of JP 08-235981.
English Abstract of JP 08-236187.
English Abstract of JP 09-027367.
English Abstract of JP 10-187896.
English Abstract of JP 11-111402.
English Abstract of JP 11-316110.
English Abstract of JP 2000-243499.
English Abstract of JP 2000-251024.
English Abstract of JP 2000-251025.
English Abstract of JP 2000-277200.
English Abstract of JP 2000-502490.
English Abstract of JP 2001-135385.
English Abstract of JP 2001-195546.
English Abstract of JP 2002-117945.
English Abstract of JP 2002-124343.
English Abstract of JP 2003-317858.
Official Letter for Japanese Patent Application No. 2004-058232, issued Apr. 19, 2007 (with translation).

* cited by examiner

CARD CONNECTOR

TECHNICAL FIELD

The present invention relates to a card connector structure mounted on electronic devices, such as cellular phones, telephones, PDAs (personal digital assistants), portable audio devices and digital cameras, and more specifically to a card connector into which two kinds of cards with different thicknesses can suitably be inserted. The present invention also relates to a card connector capable of preventing the card from falling from the card connector when it is ejected.

BACKGROUND ART

In electronic devices such as cellular phones, telephones, PDAs and digital cameras, a variety of functions are added by inserting an IC card with a built-in memory or control IC, such as a SIM (subscriber identity module) card, an MMC (multimedia card), a Smart Media (trademark), an SD (super density or secure digital) card and a Memory Stick (trademark).

As the number of kinds of IC cards has increased in recent years, a variety of standards as to the card thickness have come into use.

Of these IC cards, the MMC card for example has an external view as shown in FIG. 16 and FIGS. 17A, 17B.

As shown in FIG. 16 and FIGS. 17A, 17B, the MMC card 10 has a card body 11 with a predetermined thickness a, which has a virtually triangular cut-off corner portion 12 at its front right corner to prevent its erroneous insertion. On the front side of the bottom surface of the card body 11 there are a plurality of contact pads 13 connected to an IC circuit inside the card.

The SD card 20 with a larger thickness b than the MMC card 10 has a construction as shown in FIG. 18 and FIGS. 19A, 19B and 19C.

As shown in FIG. 18 and FIGS. 19A, 19B, 19C, the SD card 20 has an upper body portion 21 with virtually the same thickness a as the card body 11 of the MMC card 10. On the back surface of the upper body portion 21 is formed a lower body portion 23 with a predetermined thickness which has a slightly narrower width than the upper body portion 21. That is, the SD card 20 has formed along both card side edges step portions 27 that are defined by the bottom surfaces of the upper body portion 21 and the lower body portion 23. The thickness b of SD card 20 is thicker than the thickness a of the MMC card 10. The upper body portion 21 and the lower body portion 23 have a cut-off corner portion 22 at their front right corner to prevent erroneous insertion.

On the front side of the lower body portion 23 a plurality of recessed portions 24 are formed, separated from each other by a plurality of partition walls 29. In these recessed portions 24 are arranged contact pads 25 connected to an IC circuit inside the card. The depth of each recessed portion 24 is almost equal to the height of the lower body portion 23 and therefore the surface of each contact pad 25 is spaced from the front surface of the upper body portion 21 by a distance equal to the thickness a of the upper body portion 21.

The connector for removably receiving such an IC card has a plurality of contact terminals made from metal leaf springs in a connector housing. The inserted IC card is electrically connected to the electronic device, on which the connector is mounted, by these contact terminals coming into contact with the contact pads formed on the front or back surface of the inserted IC card. The contact pads of the IC card include a plurality of power supply terminals connected to power supply lines and a plurality of signal terminals for transmitting/receiving of various signals. They are connected through the contact terminals of the card connector to power supply circuits and various signal processing circuits on the electronic device.

When considering a connector shared for receiving two kinds of IC cards with different thicknesses measured from the card surface to the card bottom surface, in this connector structure, each of these different cards is generally supported at its bottom surface by the connector housing.

In the connector housing structure that supports the bottom surface of each of these cards, however, because the cards have different thicknesses, when these cards are inserted, the distances from the contact pads of each card to the contact terminals of the connector differ.

Hence, if the elastic force (contact pressure) of the contact terminals is set to conform to a thicker card, a required contact pressure cannot be given to the contact terminals when a thinner card is inserted.

Conversely, if the contact pressure of the contact terminals is set to conform to a thinner card, when a thick card is inserted, the contact terminals deflect excessively beyond the stress limit, resulting in plastic deformations of the contact pieces.

The card connectors of this type are often equipped with an eject mechanism for extracting the card from the connector.

In this eject mechanism, an elastically displaceable braking piece is pressed against the card to produce a friction force acting in a direction opposite that in which the card is ejected, in order to prevent the card from being pushed out rapidly and falling from the connector.

When considering providing a card rapid ejection prevention braking piece in a common connector that can receive two kinds of IC cards with different thicknesses, it is common practice to arrange the braking piece in said common connector so that it engages the bottom surface of each card.

However, with the braking piece arranged to engage the bottom surface of each card, when a card with a different thickness is inserted as described above, the distance from the card bottom surface to the support surface that rigidly supports the braking piece changes.

Hence, if the elastic displacement (contact pressure) of the braking piece is set to produce an appropriate friction force for the thick card, the contact pressure and the resulting frictional force are too small for the thin card, making it impossible to provide the card with an appropriate friction force.

Conversely, if the elastic displacement (contact pressure) of the braking piece is set to produce an appropriate friction force for the thin card, the insertion of a thick card causes the braking piece to deflect excessively beyond the stress limit, resulting in the braking piece being plastically deformed.

The present invention has been accomplished under these circumstances and it is an object of the present invention to solve the above-described problems by providing a card connector which can receive two kinds of cards with different thicknesses with the same contact pressures while securing a sufficient reliability of contact between the contact pads and the contact terminals.

Further, it is another object of the present invention to solve the above-described problems by providing a card connector which can apply appropriate braking forces to two kinds of cards with different thicknesses and thereby reliably prevent an uncontrolled rapid card ejection.

DISCLOSURE OF THE INVENTION

Viewed from a first aspect the present invention provides a card connector for holding either of first and second cards in a connector housing so that contact pads of the card engage contact terminals arranged in the connector housing, wherein the first card has an upper body portion, a lower body portion formed slightly narrower than the upper body portion and having recessed portions in a front side area thereof, contact pads provided in said recessed portions, and stepped portions formed along both side edges of the card by a bottom surface of said upper body portion and a bottom surface of said lower body portion, and the second card has a card body portion having almost the same horizontal shape and thickness as the upper body portion of said first card, and contact pads arranged on a bottom surface of the card body portion at almost the same horizontal positions as the contact pads of said first card, the card connector comprising: a pair of guide grooves formed in both side walls of the connector housing to support the side edges of the upper body portion of said first card and the side edges of the card body portion of said second card and thereby guide said first or second card as it is inserted or extracted; and side walls to define, below a space between the pair of the guide grooves, a space in which to accommodate the lower body portion of said first card.

In the case of the thin second card, the side edges of the card body portion are supported by the paired guide grooves formed in the connector housing.

In the case of the thick first card, the side edges of the upper body portion of almost the same thinness as the card body portion of the second card, i.e., the stepped portions, are supported by the paired guide grooves. Then, the lower body portion of the first card protruding downwardly from the upper body portion through the stepped portions is accommodated in a space below a space formed between the guide grooves.

As described above, because, whichever of the first and second cards is inserted, the card is supported in the connector in such a way that the distance from the contact pads of the first card to the contact terminals of the connector is equal to the distance from the contact pads of the second card to the contact terminals, the elastic displacement (contact pressure) of the contact terminals remains the same, whichever card is inserted. This ensures a stable contact reliability for both of the cards.

A second aspect of the invention provides a card connector according to the first aspect, which further comprises: an eject mechanism to eject said card; and an elastic braking piece arranged at such a position that it engages the bottom surface of the upper body portion of said first card when said first card is inserted and engages the bottom surface of the card body portion of said second card when said second card is inserted, the braking piece applying a braking force to said first or second card when it is ejected.

In the second aspect of the invention, the elastic braking piece to apply the braking force to either of said first and second cards during the card ejection engages the bottom surface of the upper body portion of said first card, i.e., the upper side of the stepped portion, when said first card is inserted and engages the bottom surface of the card body portion of said second card when said second card is inserted.

Thus, with this invention, because the elastic braking piece is pressed against the equal-thickness portions of the first and second cards with different thicknesses, the displacement or contact pressure of the elastic braking piece remains the same, whichever of the first and second cards is inserted. Hence, the frictional resistance of the braking piece applied to the card when the card is ejected remains the same for the first and second cards, thus preventing both of these cards from rapidly coming out and falling from the connector, realizing a stable ejection operation.

In another aspect of the invention, the housing top plate forming the upper walls of the guide grooves is formed with an opening having a width larger than that of the lower body portion of the first card or with a recess that recedes in the height direction.

Hence, if the first card is erroneously inserted upside down, the lower body portion of the first card can escape upward through the opening or recess, making it possible to give the braking piece the same displacement as during the normal insertion and thereby prevent the braking piece from being deformed or displaced in excess of its stress limit.

In a further aspect of the invention, because the elastic braking piece is pressed against the equal-thickness portions of the first and second cards with different thicknesses, the same braking force can be applied to the first and second cards with different thicknesses in the card retraction direction during the card insertion process. Hence, either of the cards can be held stably and reliably, preventing the card from falling out from the connector due to unexpected external forces.

BEST MODE FOR CARRYING OUT THE INVENTION

Now, embodiments of this invention will be described in detail by referring to the accompanying drawings.

First Embodiment

Figure 1:
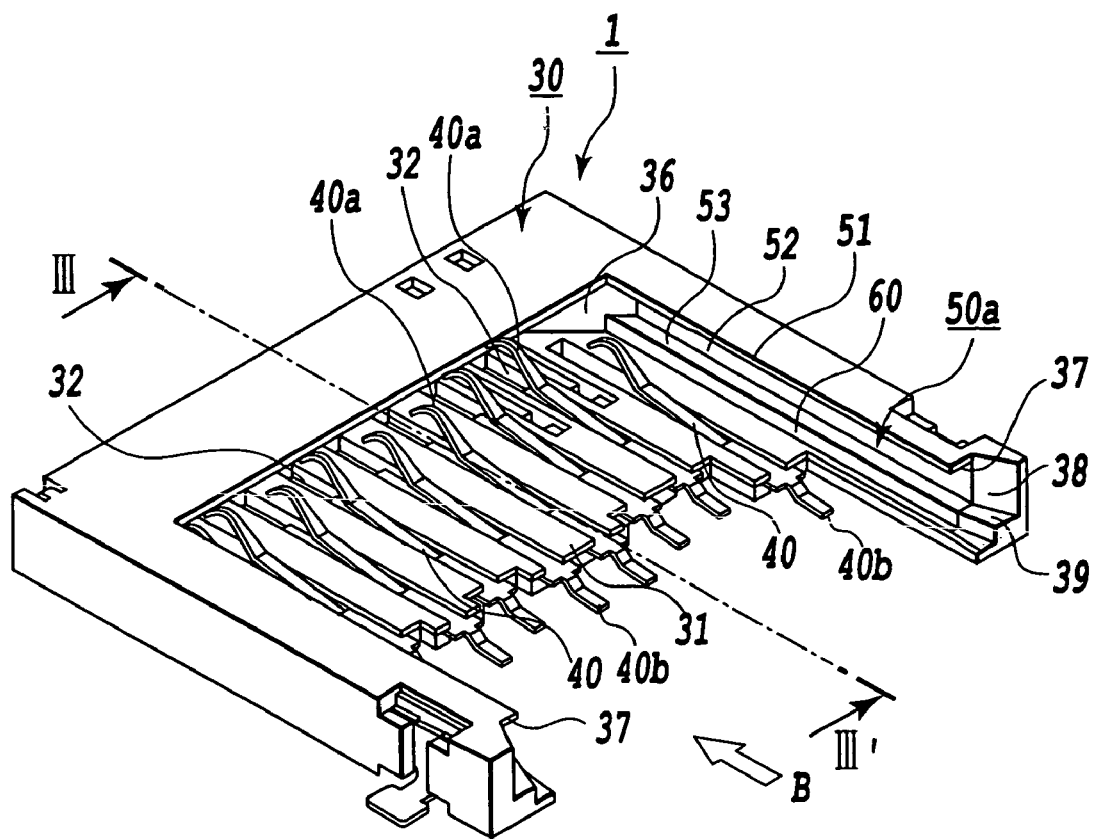
FIG. 1 is a perspective view showing an overall construction of a card connector according to a first embodiment of the invention.
Figure 2:
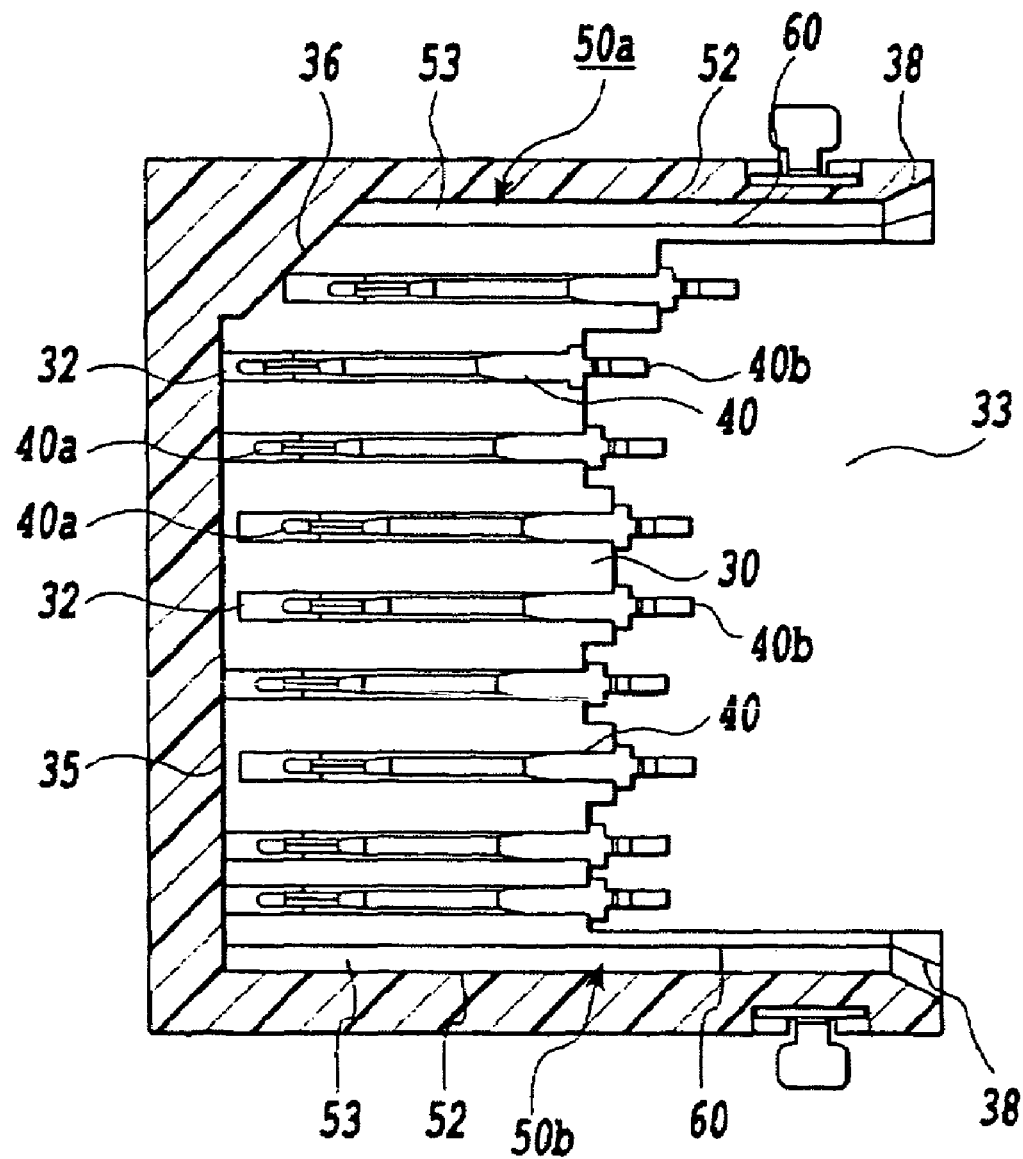
FIG. 2 is a horizontal cross section showing the card connector according to the first embodiment of the invention.
Figure 3:
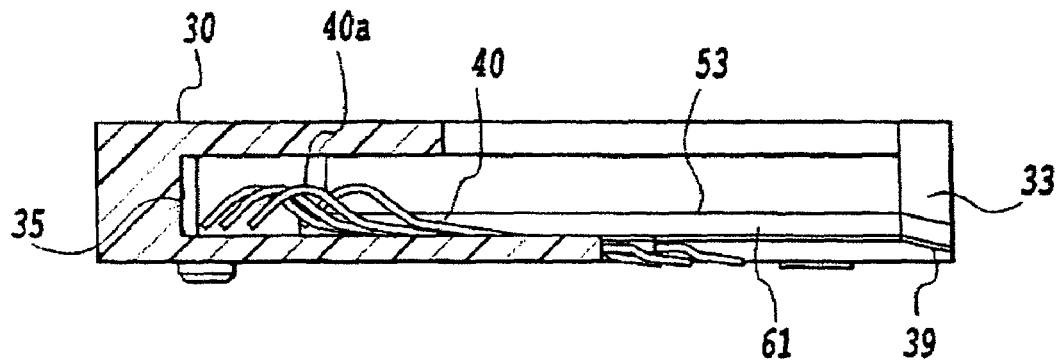
FIG. 3 is a vertical cross section, taken along the line III-III of FIG. 1, of the card connector according to the first embodiment of the invention.
Figure 4:
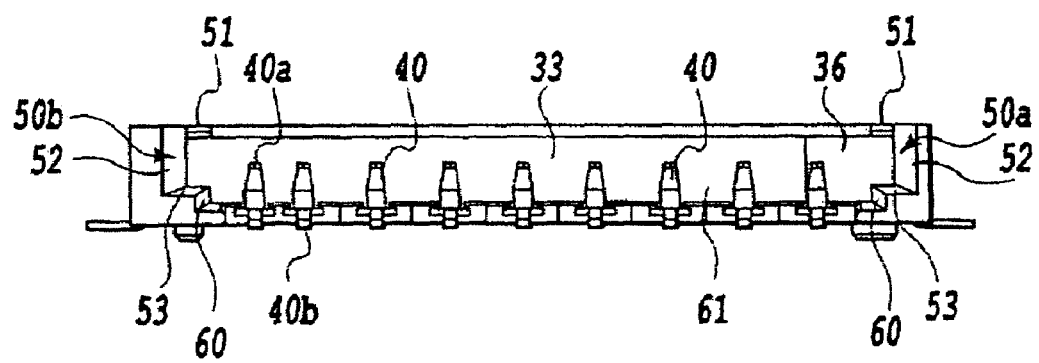
FIG. 4 is a front view of the card connector according to the first embodiment of the invention.

FIG. 1 is a perspective view showing a card connector according to the first embodiment of this invention. FIG. 2 is a horizontal cross section of the card connector. FIG. 3 is a cross section taken along the line III-III of FIG. 1. FIG. 4 is a front view of the card connector as seen from the direction of arrow B in FIG. 1.

The card connector 1 is mounted on an electronic device, such as cellular phone, PDA, portable audio device and camera.

Figure 16:
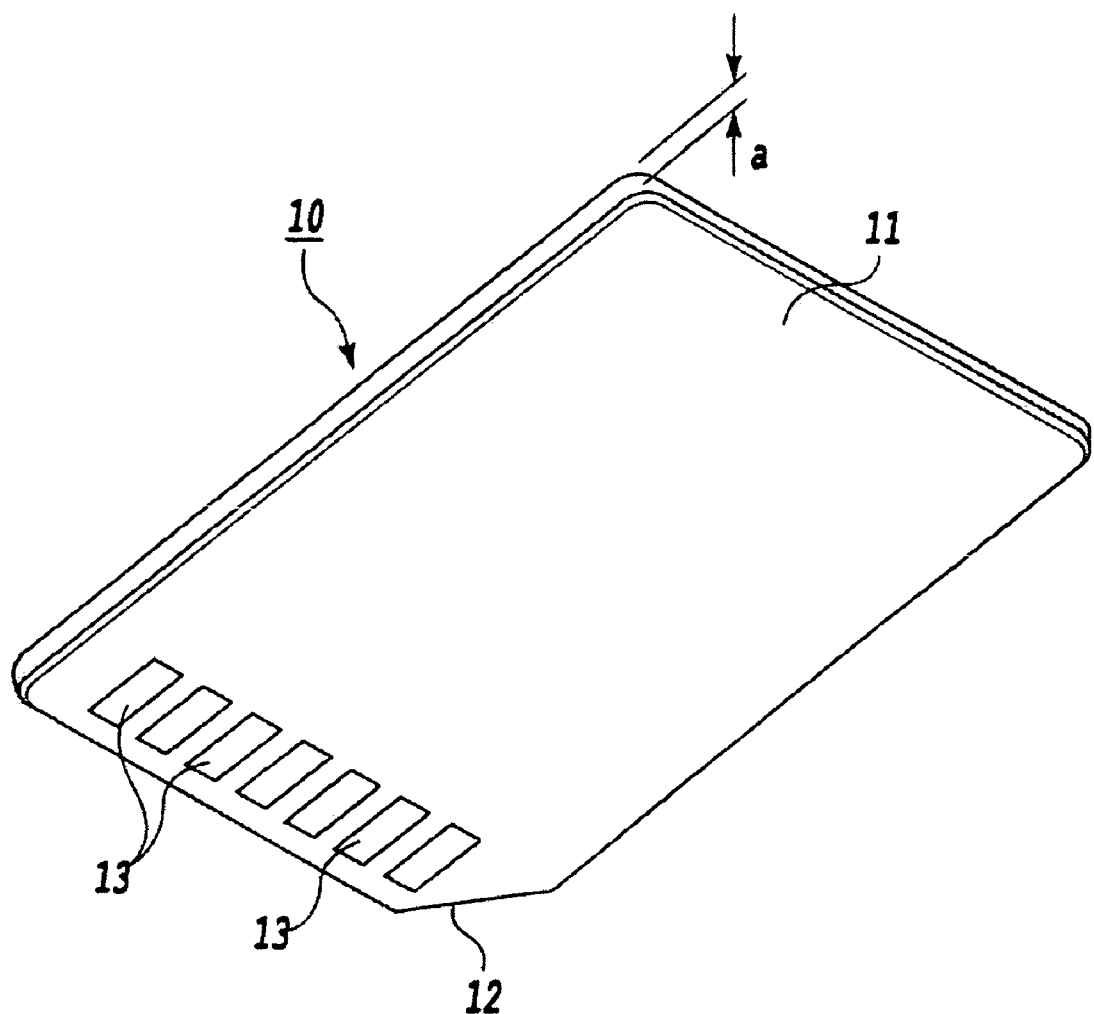
FIG. 16 is a perspective view showing a thin card applied to the present invention.
Figures 17A, 17B:
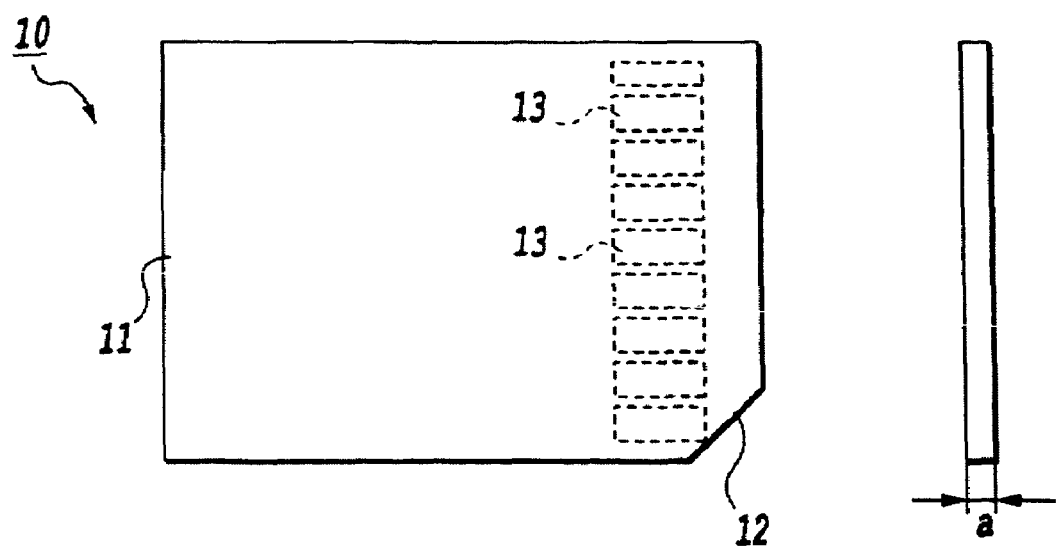
FIG. 17A and FIG. 17B are a plan view and a front view, respectively, showing a thin card of FIG. 16.
Figure 18:
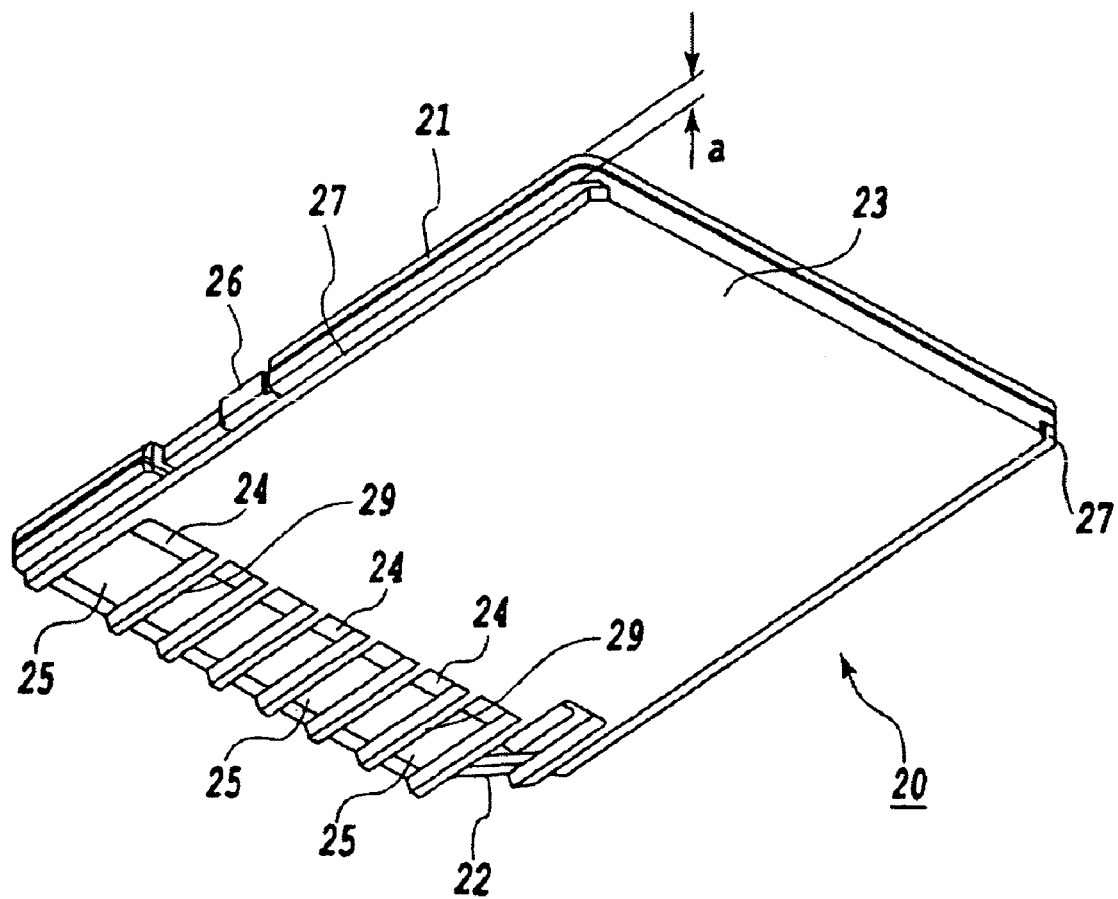
FIG. 18 is a perspective view showing a double-height thick card applied to the present invention.
Figure 19A:
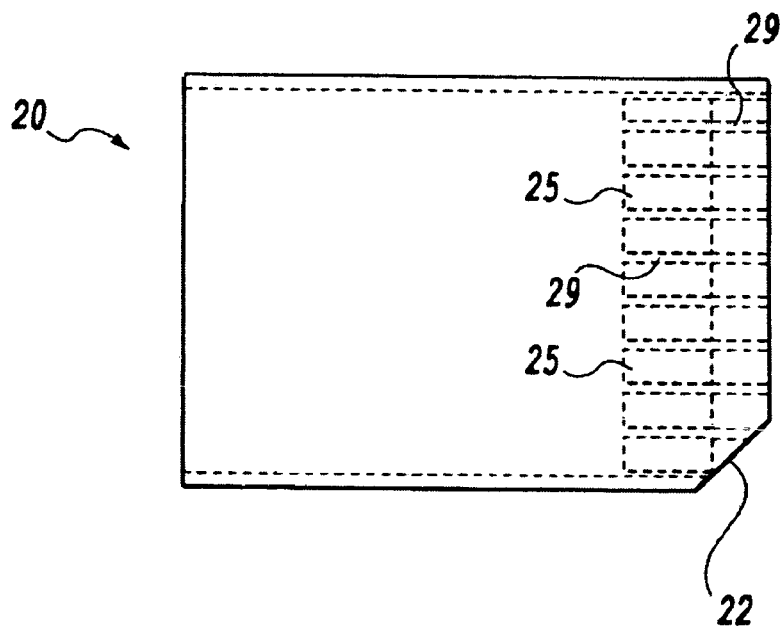
FIGS. 19A, 19B and 19C are a plan view, a front view and a side view, respectively, showing a double-height thick card of FIG. 18.
Figure 19B:
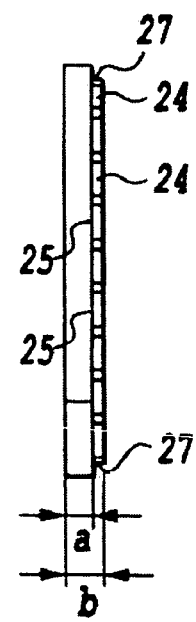
Figure 19C:
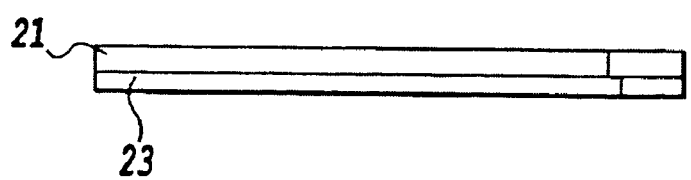

The connector 1 shown in FIG. 1 to FIG. 4 can accommodate both a thin card 10 such as an MMC card shown in FIG. 16 and FIG. 17 and a double-height thick card 20 with step portions such as an SD card shown in FIG. 18 and FIG. 19.

In FIG. 1 to FIG. 4, the card connector 1 has a connector housing 30 roughly U-shaped when viewed from above and which is made from an insulating material such as resin and formed in one piece having side leg portions.

A base plate 31 of the connector housing 30 is formed with a plurality of press-fit grooves 32 in which a plurality of contact terminals 40 made from leaf springs are positioned and fitted under pressure. These contact terminals 40 include power supply terminals and signal terminals. Each of the contact terminals 40 has a base portion supported in the press-fit groove 32 and an elastic deformation portion extending like a cantilever beam from the base portion to above the base plate 31. The elastic deformation portion has a contact portion 40a projecting in an arc at its front end side which contacts under pressure the associated one of a plurality of contact pads 13, 25 of the card 10, 20. A terminal portion 40b formed on the base end side of each base portion is soldered to the associated one of contact pads on a printed circuit board of the electronic device.

Each of the IC cards 10, 20 is inserted into the connector 1 through a card insertion opening 33 formed at the front of the housing 30.

The connector housing 30 has an abutment wall 35 (FIG. 3) that combines the side leg portions and against which the front end of the inserted IC card 10, is made to abut. At one corner where the abutment wall 35 and one of the side leg portions intersect, a corner wall 36 is formed which the cut-off corner portion 12, 22 of the inserted IC card 10, 20 engages.

The IC card 10, 20 is guided being supported its side edge portions by a pair of guide grooves 50a, 50b formed in inner side walls of the side leg portions of the housing 30 as it is inserted or retracted.

One of the guide grooves 50a extends from the card insertion opening 33 to the corner wall 36 and the other guide groove 50b extends from the card insertion opening 33 to the abutment wall 35. These guide grooves 50a, 50b are each formed by an upper wall 51, a side wall 52 and a lower wall 53 so that their opened portions face each other.

At the inlet portions of the guide grooves 50a, 50b the upper wall 51 is formed with a notch 37 and the side wall 52 and lower wall 53 are formed with tapered surfaces 38, 39, respectively, to facilitate the insertion of the card 10, 20.

From the edge of the lower wall 53 of each guide groove 50a, 50b a second side wall 60 extends vertically downwardly almost at right angles to the lower wall 53. For each of the second side walls 60 a second lower wall is formed, and the upper surface of the second lower wall is flush with the upper surface of the base plate 31. Between the two parallel second side walls 60 there is formed a space 61.

Figure 5:
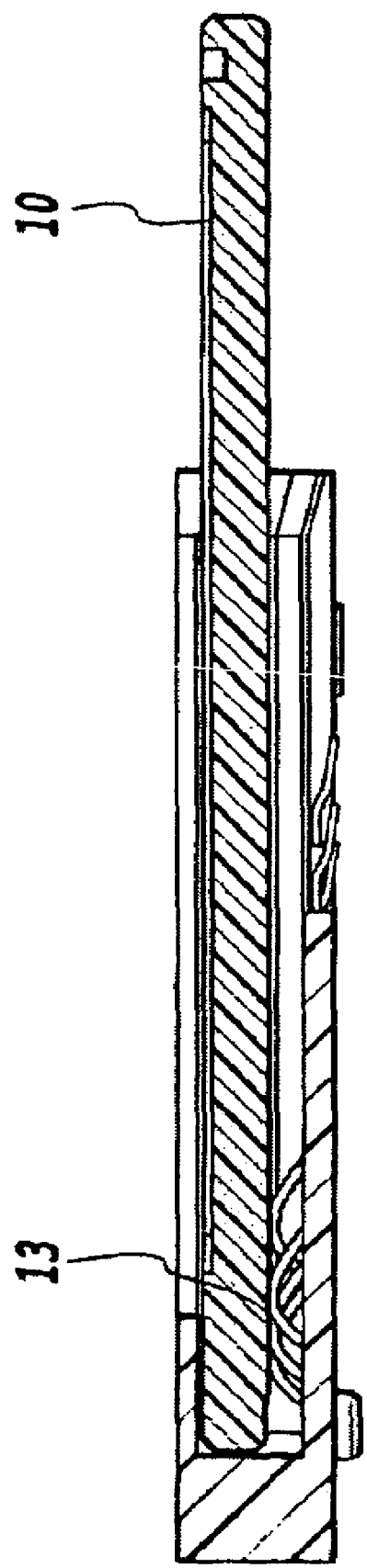
FIG. 5 is a vertical cross section similar to FIG. 3 showing the card connector according to the first embodiment of the invention with a thin card inserted.

FIG. 5 shows the connector 1 with the thin card 10 inserted therein. When the thin card 10 is inserted into the connector 1, the side surfaces of the card body 11 are guided by the side walls 52 of the guide grooves 50a, 50b and the side edge portions of the bottom surface of the card body 11 are guided being supported by the lower walls 53. Further, the floating of the card 10 due to the elastic force of the contact terminals 40 of the connector 1 is prevented by the side edge portions of the top surface of the card body 11 being restricted by the upper walls 51 of the guide grooves 50a, 50b.

Figure 6:
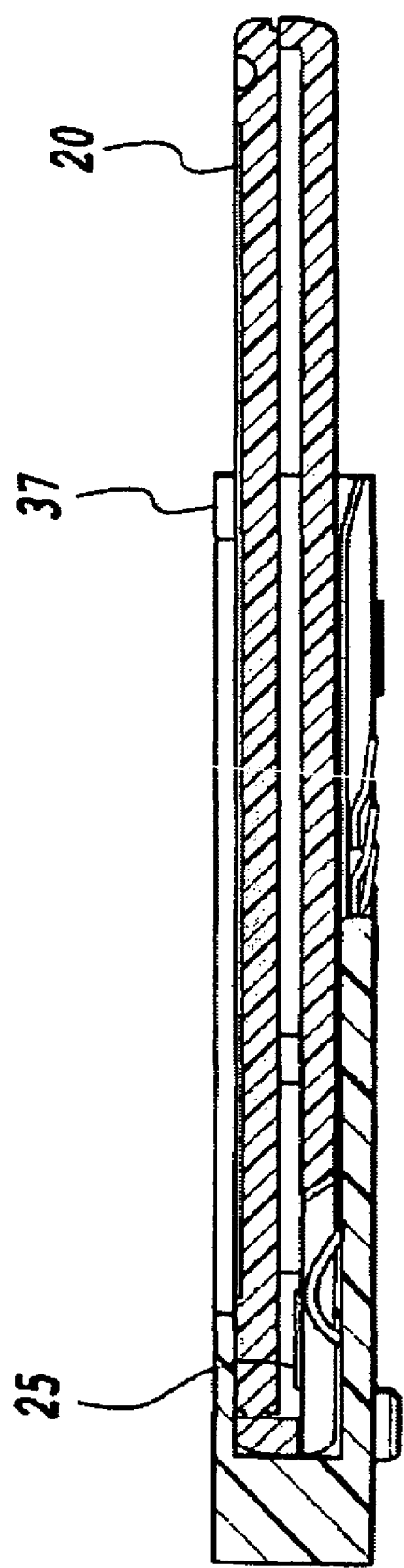
FIG. 6 is a vertical cross section similar to FIG. 3 showing the card connector according to the first embodiment of the invention with a double-height thick card inserted.
Figure 7:
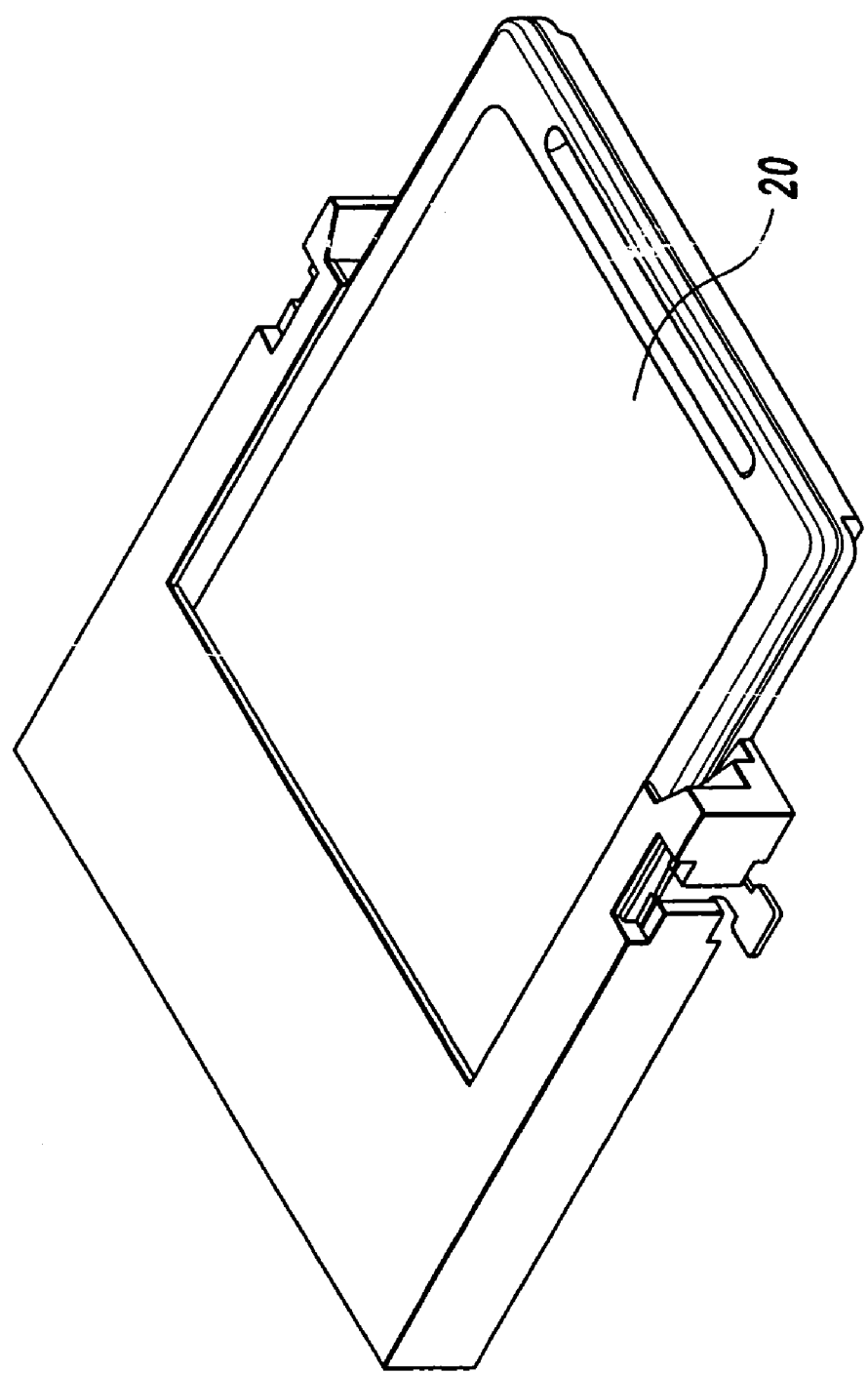
FIG. 7 is a perspective view showing the card connector according to the first embodiment of the invention with a double-height thick card inserted.

FIG. 6 and FIG. 7 show the connector 1 with the double-height thick card 20 inserted therein.

When the double-height thick card 20 is inserted into the connector 1, the side surfaces of the upper body portion 21 are guided by the side walls 52 of the guide grooves 50a, 50b and the side edge portions of the bottom surface of the upper body portion 21, i.e., the step portions 27, are supported on the lower walls 53. Further, the floating of the card 20 due to the elastic force of the contact terminals 40 is prevented by the side edge portions of the top surface of the upper body portion 21 being restricted by the upper walls 51, as in the case with the thin card 10.

Further, the lower body portion 23 of the double-height thick card 20 is accommodated in the space 61 between the second side walls 60. That is, the side surfaces of the lower body portion 23 of the double-height thick card 20 are guided by the second side walls 60.

In the thin card 10, as shown in FIG. 16 and FIG. 17, the contact pads 13 are on the bottom surface of the card body 11.

In the double-height thick card 20, on the other hand, the contact pads 25 as shown in FIG. 18 and FIG. 19 are on the bottom surface of the upper body portion 21, i.e., in the recessed portions 24 formed in the lower body portion 23.

The connector structure described above supports the inserted card in the direction of height as follows. The thin card 10 is supported at its bottom surface by the lower walls 53 of the guide grooves 50a, 50b, and the double-height thick card 20 is supported at the bottom surface of its upper body portion 21 similarly by the lower walls 53 of the guide grooves 50a, 50b.

In this connector structure, therefore, whichever of the cards 10 and 20 is inserted, the distance from the contact pads 13 or 25 to the contact terminals 40 of the connector remains unchanged, so that the contact terminals are given the same elastic displacement, whichever card 10 or 20 is inserted. Hence, the both cards 10, 20 are given almost the same contact pressures and therefore stable contact reliability.

In the connector structure above, the positioning in the lateral direction of the double-height thick card 20 with respect to the connector 1 can be realized either by the side walls 52, which form the guide grooves 50a, 50b, or by the second side walls 60 below. When a dimensional difference between the horizontal shapes of the thin card 10 and the upper body portion 21 of the double-height thick card 20 is small, the lateral positioning of the double-height thick card 20 may be done by the upper side walls 52. When the dimensional difference is large, the lateral positioning of the double-height thick card 20 may be done by the lower second side walls 60.

Second Embodiment

Next, the second embodiment of the present invention will be described by referring to FIG. 8 to FIG. 14.

Figure 8:
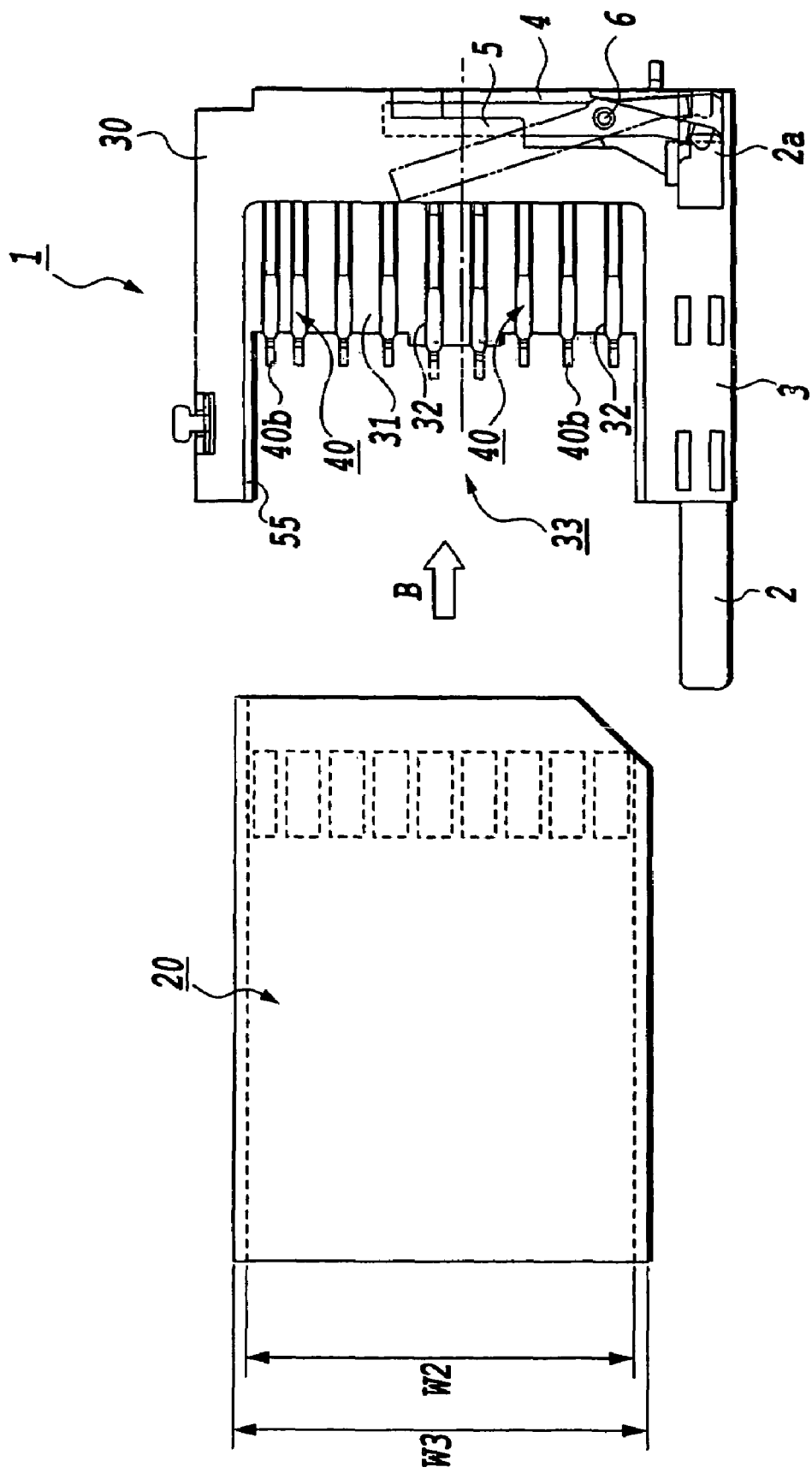
FIG. 8 is a plan view showing a card connector according to a second embodiment of the invention.
Figure 9:
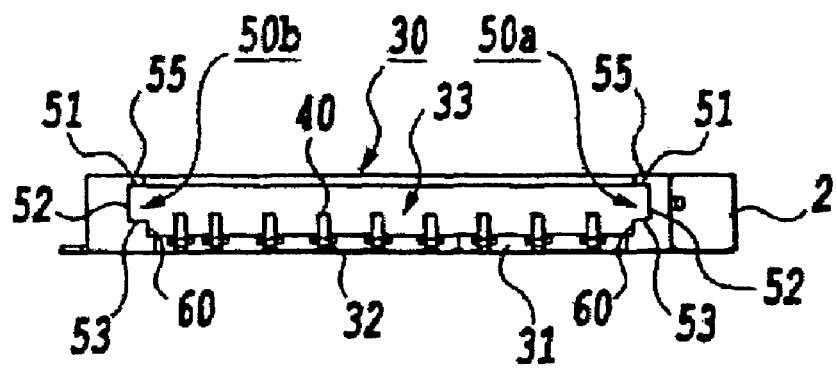
FIG. 9 is a front view showing the card connector according to the second embodiment of the invention.
Figure 10:
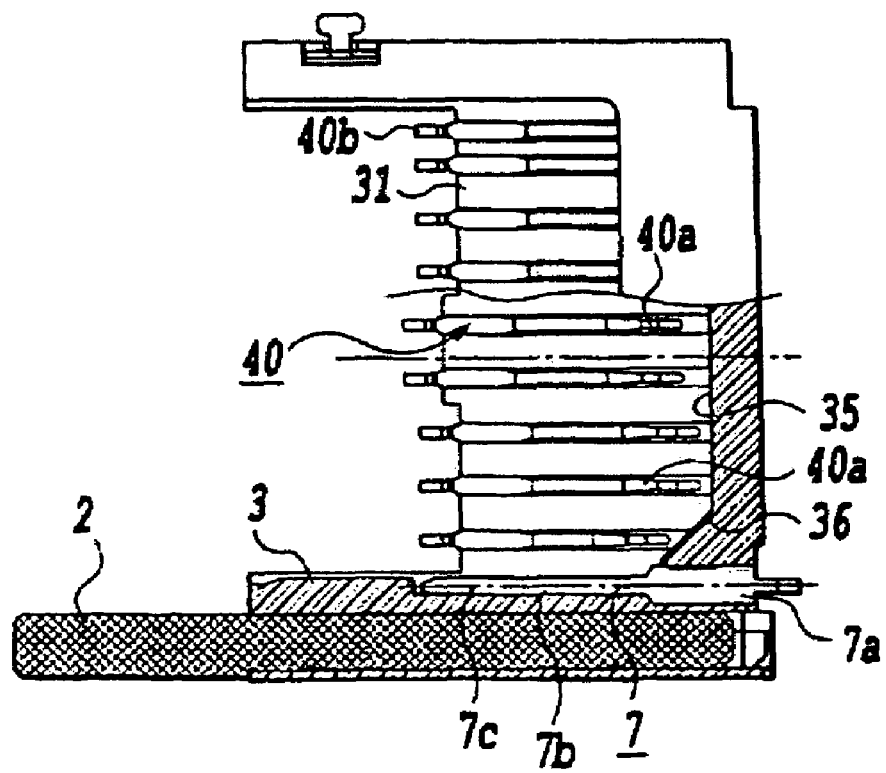
FIG. 10 is a partially cutaway plan view showing the card connector according to the second embodiment of the invention.

FIG. 8 is a plan view showing a card connector according to the second embodiment of this invention. FIG. 9 is a front view of the card connector as seen from a direction of arrow B in FIG. 8. FIG. 10 is a partly cutaway plan view of the card connector.

The connector 1 shown in FIG. 8 to FIG. 10 can accommodate both a thin card 10 such as an MMC shown in FIG. 16 and FIG. 17 and a double-height thick card 20 with step portions such as an SD card shown in FIG. 18 and FIG. 19. Components with the same functions as those of the first embodiment are assigned like reference numbers to facilitate the understanding of the second embodiment.

In FIG. 8 to FIG. 10, a base plate 31 of the connector housing 30 is formed with a plurality of press-fit grooves 32 in which a plurality of contact terminals 40 made from contact leaf springs are fitted under pressure. The contact terminals 40 are each supported like a cantilevered beam and have a contact portion 40a projecting at the front end side thereof so that the contact portions 40a come into pressure contact with a plurality of contact pads 13, 25 of the card 10, 20. Terminal portions 40b formed on the base end side of the contact terminals 40 are soldered to contact pads of a printed circuit board of an electronic device.

These contact terminals 40 make electrical connection between the card 10, 20 and the electronic device and at the same time provide an appropriate card holding force by their elastic force when the card is inserted.

The IC card 10, 20 is inserted into the connector 1 through a card insertion opening 33 formed at the front of the housing 30.

The connector housing 30 is formed with an abutment wall 35 which the inserted IC card 10, 20 engages. At one corner of the abutment wall 35 there is formed a protruding corner wall 36 which the cut-off corner portion 12, 22 of the IC card 10, 20 engages.

In one side portion of the connector housing 30 a lever holding portion 3 is formed outside the guide groove 50a to slidably guide an eject lever 2 between an initial position and an eject position in the direction of card insertion and extraction. The lever holding portion 3 encloses the eject lever 2 in three or four directions.

In the housing 30 on the far side of the abutment wall 35 there is a cam lever accommodating portion 5 in which a cam lever 4 is installed. The cam lever 4 is mounted to be rotatable about a shaft 6 in a plane parallel to the surface of the base plate 31 of the housing 30. One end of the cam lever 4 can engage a front end 2a of the eject lever 2 and the other end can engage the front end wall of the card 10 or 20.

The eject lever 2 and cam lever 4 form an eject mechanism for ejecting the card 10, 20.

When the card 10, 20 is inserted into the connector 1, the front end wall of the card 10, 20 pushes one end of the cam lever 4 which is then rotated to a position indicated by a dashed line in FIG. 8. This causes the other end of the cam lever 4 to push the front end 2a of the eject lever 2, retracting the eject lever 2.

When, with the card inserted, the eject lever 2 is pushed forwardly, the front end 2a of the eject lever 2 presses one end of the cam lever 4, rotating the cam lever 4 to a position indicated by a two-dot chain line in FIG. 8. As a result of this rotation, the other end of the cam lever 4 pushes the front end wall of the card 10, 20, causing the card to be ejected.

The IC card 10, 20 is guided being supported its side edges portion by a pair of guide grooves 50a, 50b formed in inner side walls of the housing 30 as it is inserted or extracted.

One of the guide grooves 50a extends from the card insertion opening 33 to the corner wall 36 and the other guide groove 50b extends from the card insertion opening 33 to the abutment wall 35.

These guide grooves 50a, 50b are each formed by an upper wall 51, a side wall 52 and a lower wall 53. From the edge of the lower wall 53 of each guide groove 50a, 50b a second side wall 60 extends downwardly.

Figure 11:
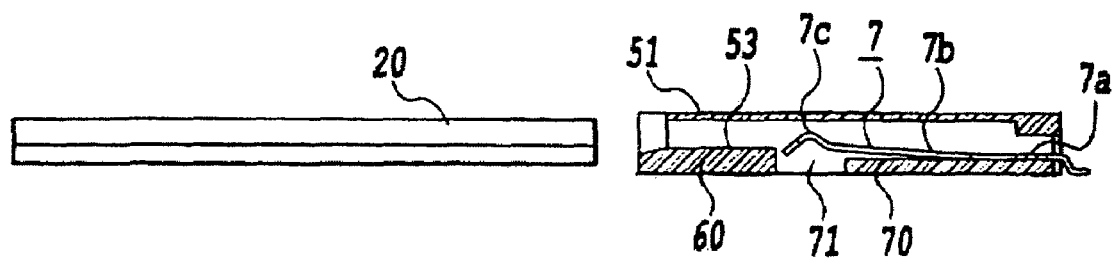
FIG. 11 is a cross section showing the card connector according to the second embodiment of the invention before the card is inserted.

Further, as shown in FIG. 10 and FIG. 11, a braking piece 7 made from an elastic leaf spring is installed in a part of the guide groove 50a on the far side thereof. The braking piece 7 applies a braking force to the card 10, 20 as the card is ejected.

The braking piece 7 has a stationary portion 7a secured to a braking piece support surface 70, a leaf spring portion 7b extending in the direction of card insertion and extraction, and a front engagement portion 7c projecting in an arc to engage the bottom surface of the card 10, 20. With the stationary portion 7a rigidly fixed, the braking piece 7 is supported like a cantilevered beam. Below the front engagement portion 7c of the braking piece 7, the housing 30 has an opening 71 to allow the front engagement portion 7c to escape downwardly. To apply the braking force to the card 10, 20 effectively as it is ejected, the far side of the braking piece 7 is rigidly secured and the front end is set free.

The braking piece support surface 70, to which the braking piece 7 is secured, is formed at a position a predetermined distance lower than the lower wall 53 of the guide groove 50a so that when the braking piece 7 is elastically deformed by the pressing force of the card, the braking piece 7 can secure a predetermined projection height. The width of the leaf spring portion 7b and the front engagement portion 7c of the braking piece 7 is set almost equal to the width of the bottom surface of the edge portion of the upper body portion 21 of the double-height thick card 20, i.e., the width of the step portion 27.

Figure 12:
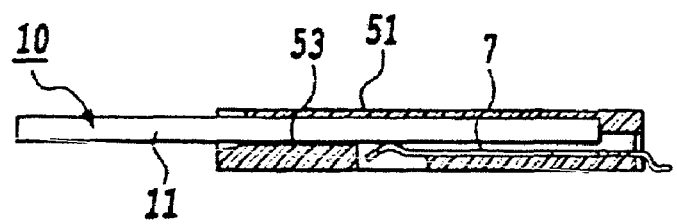
FIG. 12 is a cross section showing the card connector according to the second embodiment of the invention when the thin card is inserted.

FIG. 12 shows the state of the connector 1 with the thin card 10 inserted therein.

When the thin card 10 is inserted into the connector 1, the side surfaces of the card body 11 are guided by the side walls 52 of the guide grooves 50a, 50b and the side edge portions of the bottom surface of the card body 11 are supported by the lower walls 53. Further, the side edge portions of the top surface of the card body 11 are restricted by the upper walls 51 to prevent the card 10 from being floated by the elastic force of the contact terminals 40 of the connector 1.

Further, when the thin card 10 is inserted, the front engagement portion 7c of the braking piece 7 is pressed down by the side edge portion of the bottom surface of the card 10, elastically deforming the braking piece 7 downward. Hence, with the card 10 inserted, the pressing load of the braking piece 7 is applied to the bottom surface of the card 10, so that when the card is ejected by the eject mechanism, the card can be applied a braking force.

Figure 13:
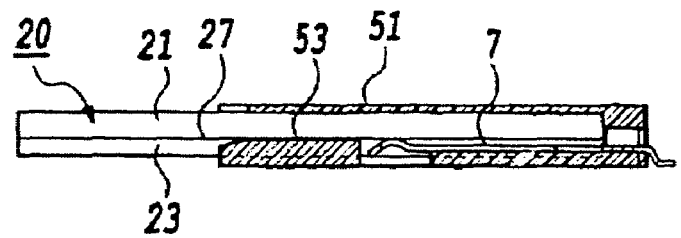
FIG. 13 is a cross section showing the card connector according to the second embodiment of the invention when the double-height thick card is inserted.
Figure 14:
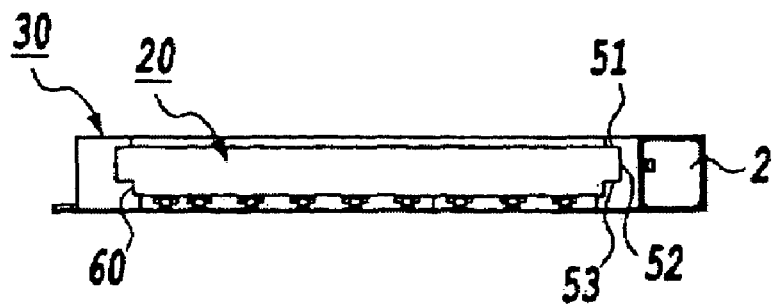
FIG. 14 is a front view showing the card connector according to the second embodiment of the invention when the double-height thick card is inserted.

FIG. 13 and FIG. 14 show the state of the connector 1 when the double-height thick card 20 is inserted.

When the double-height thick card 20 is inserted into the connector 1, the side surfaces of the upper body portion 21 of the card 20 are guided by the side walls 52 of the guide grooves 50a, 50b and the side edge portions of the bottom surface of the upper body portion 21, i.e., the step portions 27, are supported by the lower walls 53. Further, the side edge portions of the top surface of the upper body portion 21 are restricted by the upper walls 51 to prevent the card 20 from being floated by the elastic force of the contact terminals 40. The lower body portion 23 of the double-height thick card 20 is accommodated in the housing space between the second side walls 60.

Further, when the double-height thick card 20 is inserted, the front engagement portion 7c of the braking piece 7 is pressed down by the side edge portion of the bottom surface of the upper body portion 21 of the card 20, i.e., by the step portion 27, elastically deforming the braking piece 7 downwardly. Hence, with the card 20 inserted, the pressing load of the braking piece 7 is applied to the step portion 27 of the card 20 so that when the card 20 is ejected, an appropriate braking force can be applied to the card.

In the connector structure above, because the braking piece 7 is so arranged that it presses, from below, against equal-thickness portions of the two different-thickness cards 10, 20, the braking piece 7 is displaced by the same distance, whichever of the two cards 10, 20 is inserted. This means that the contact pressures produced by the braking piece 7 engaging the card 10 and the card 20 are virtually equal. Therefore, when the card is ejected by the eject mechanism, the frictional resistances applied by the elastic force of the braking piece 7 to the two cards 10, 20 are equal, thus assuring stable ejection operations for the two cards. Further, the braking piece 7 also functions as a braking means to prevent the card from falling from the connector due to unexpected external forces when the card is being inserted. The braking piece 7 can therefore ensure more stable holding of the card.

Another Embodiment

Figure 15A:
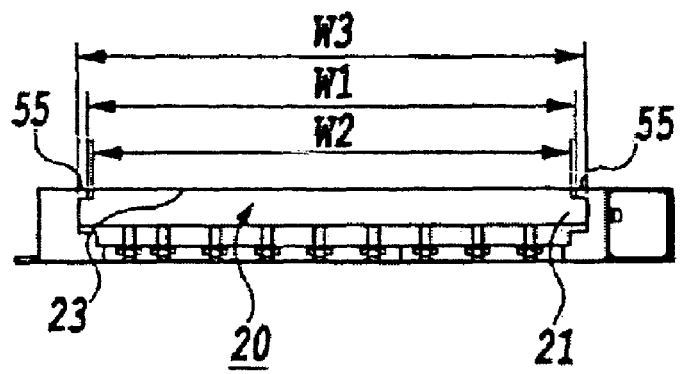
FIG. 15A and FIG. 15B are a front view and a vertical cross section, respectively, showing a card connector according to another embodiment of the invention.
Figure 15B:
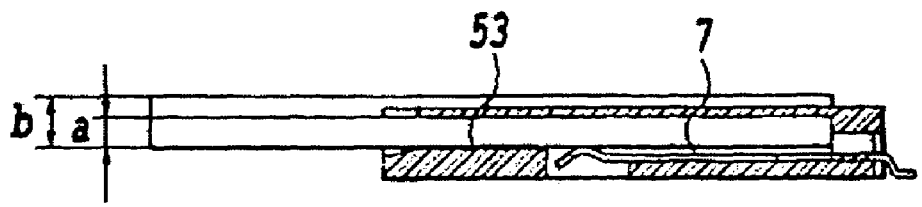

FIG. 15A and FIG. 15B show another embodiment of this invention. In this embodiment an opening width W1 of a top plate 55 forming the upper walls 51 of the guide grooves 50a, 50b of the connector housing 30 is set larger than a width W2 of the bottom surface of the lower body portion 23 of the double-height thick card 20 and smaller than a width W3 of the upper body portion 21 (see FIG. 15A and FIG. 15B; FIGS. 15A and 15B show the state in which the double-height thick card 20 is inserted upside down).

Hence, in this construction, if the double-height thick card 20 is erroneously inserted upside down, the upper body portion 21 is guided by the guide grooves 50a, 50b with the lower body portion 23 of the double-height thick card 20 received in the opening of the width W1 formed in the top plate 55. As a result, the elastic displacement of the braking piece 7 when the double-height thick card 20 is erroneously inserted upside down and the elastic displacement when the card is inserted normally are equal. Hence, even when the double-height thick card 20 is wrongly inserted, the braking piece 7 is not displaced in excess of its stress limit and can reliably be protected against being plastically deformed.

Although, in the embodiments described above, the braking piece 7 of the present invention is applied the card connector having an eject mechanism, the braking piece 7 of this invention may also be applied to card connectors with no eject mechanism. That is, in this kind of connectors the falling of the card is prevented basically by the pressing force of a plurality of contact terminals 40. For a more reliable and stable holding of the card, the card connector with no eject mechanism may be provided with the braking piece 7 which is used to apply the braking force to the card in the card extraction direction during the process of card insertion.

While in the above embodiments the top plate 55 of the connector housing 30 covers only the guide grooves 50a, 50b, the abutment wall 35 and their vicinities, the top plate 55 may cover the entire surface or almost all of the surface of the card. In that case, to accommodate the lower body portion 23 of the double-height thick card 20 (allow it to escape upward) when the card 20 is wrongly inserted upside down, the top plate 55 needs to be formed with a recess that recedes in the height direction.

Further, the connector housing may be constructed of a plurality of housing members, such as an upper metal housing made by sheet metal working and a lower housing formed of resin.

Further, where the connector is mounted upside down on a printed circuit board, the printed circuit board may be used to serve as the top plate of the connector.

Further, the embodiments described above take an SD card as an example of the double-height thick card 20 and an MMC card as an example of the thin card, but the present invention can be applied to any other kind of IC card.

INDUSTRIAL APPLICABILITY

With this invention, because the card is supported in the connector in such a manner that no matter which of the two cards with different thicknesses is inserted, the distance from the contact pads of the card to the contact terminals of the connector remains the same, the contact terminals are given the same elastic displacements by whichever card is inserted. Hence, the both cards can secure stable contact reliability.

Because the elastic braking piece is pressed against the equal-thickness portions of the first and second cards with different thicknesses, the displacement of the elastic braking piece remains the same, whichever of the first and second cards is inserted. Hence, the frictional resistance of the braking piece applied to the card when the card is ejected remains the same for the first and second cards, thus preventing both of these cards from rapidly coming out and falling from the connector, realizing a stable ejection operation.

Further, in this invention, if the double-height thick card is erroneously inserted upside down, the lower body portion of the double-height thick card can escape upward through the opening or recess formed in the housing top plate, making it possible to give the braking piece the same elastic displacement as during the normal insertion and thereby prevent the braking piece from being deformed or displaced in excess of its stress limit.

Further, in this invention, because the elastic braking piece applies a braking force to the card in the card extraction direction when the card is inserted, the card can be held stably and reliably, preventing the card from falling out from the connector due to unexpected external forces.

The invention claimed is:

1. A card connector for holding either of first and second cards, the first card having an upper body portion, a lower body portion, recessed portions formed on a bottom surface of the first card separated from each other by a partition wall, and contact pads provided in the recessed portions, the second card having a card body portion having a size substantially the same as a size of the upper body portion of the first card, and contact pads arranged on a bottom surface of the card body portion, the card connector comprising:
  a connector housing having an upper wall and side leg portions adjacent to both ends of the upper wall, each side leg portion including first and second side walls and a lower wall formed between the first and second side walls,
  a base plate adjacent to the side leg portions, the base plate being opposite the upper wall,
  contact terminals arranged on the base plate, at an interval of space capable of accommodating the partition wall of the first card, each of the contact terminals having a base portion and an elastic deformation portion which elastically deforms to electrically couple with the contact pads arranged on the first and second cards,
  a first space defined by the upper wall, the first side walls, and the lower walls to hold side edge portions of the upper body portion of the first card and the body portion of the second card and to accommodate the upper body portion of the first card and the body portion of the second card, and
  a second space defined by the second side walls, to accommodate the lower body portion of the first card, the second space being between the first space and the base plate, wherein
  the base portion of the contact terminal is placed in the base plate, the elastic deformation portion of the contact terminal extends through the second space into the first space, and
  no portion of the base plate extends into the second space.

2. A card connector according to claim 1, wherein the second side walls of the side leg portions are operable to guide side surfaces of the lower body portion of the first card.

3. A card connector according to claim 1, further comprising:
  an eject mechanism to eject the first or second card; and
  an elastic braking piece arranged at such a position that the bottom surface of the upper body portion of the first card presses the elastic braking piece when the first card is inserted and the bottom surface of the card body portion of the second card presses the elastic braking piece when the second card is inserted, the braking piece applying a braking force to the first or second card when the first or second card is ejected.

4. A card connector according to claim 3, wherein the elastic braking piece is secured to a position that is in a far part of one of the pair of guide grooves formed by the upper wall, the first side walls, and the lower walls and that is lower than the second side wall adjacent to the one of the pair of the guide grooves.

5. A card connector according to claim 1, wherein the upper wall has an opening having a width that is larger than that of the lower body portion of the first card.

6. A card connector according to claim 1, wherein the upper wall has a recess adjacent to the first space having a width that is larger than that of the lower body portion of the first card.

7. A card connector according to claim 1, further comprising:
  an elastic braking piece arranged at such a position that the bottom surface of the upper body portion of the first card presses the elastic braking piece when the first card is inserted and that the bottom surface of the card body portion of the second card presses the elastic braking piece when the second card is inserted, the braking piece applying a braking force to the first or second card in a card extraction.

8. A card connector according to claim 7, wherein the elastic braking piece is secured to a position that is in a far part of one of a pair of guide grooves formed by the upper wall, the first side walls, and the lower walls and that is lower than the second side wall adjacent to the one of the pair of the guide grooves.

9. A card connector according to claim 7, wherein the upper wall has an opening having a width that is larger than that of the lower body portion of the first card.

10. A card connector according to claim 7, wherein the upper wall has a recess adjacent to the first space having a width that is larger than that of the lower body portion of the first card.

11. A card connector according to claim 1, further comprising:
  an elastic braking piece arranged at such a position that the bottom surface of the upper body portion of the first card presses the elastic braking piece when the first card is inserted and that the bottom surface of the card body portion of the second card presses the elastic braking piece when the second card is inserted, a displacement of the elastic braking piece at the time when the first card is inserted is substantially equal to one at the time when the second card is inserted.

12. A card connector according to claim 11, wherein the second side walls are operable to guide side surfaces of the lower portion of the first card.

13. A card connector according to claim 11, further comprising an eject mechanism to eject the first or second card.

14. A card connector according to claim 11, wherein the elastic braking piece is secured to a position that is in a far part of one of a pair of guide grooves formed by the upper wall, the first side walls, and the lower walls and that is lower than the second side wall adjacent to the one of the pair of the guide grooves.

15. A card connector according to claim 11, wherein the upper wall has an opening having a width that is larger than that of the lower body portion of the first card.

16. A card connector according to claim 11, wherein the upper wall has a recess adjacent to the first space having a width that is larger than that of the lower body portion of the first card.

17. A card connector according to claim 11; wherein the elastic braking piece applies a braking force to the first and second card in a card extraction direction.

18. A card connector according to claim 17, wherein the elastic braking piece is secured to a position which is in a far part of one of a pair of guide grooves formed by the upper wall, the first side walls and the step portions and which is lower than the second side wall adjacent to the one of the pair of the guide grooves.

19. A card connector according to claim 17, wherein the upper wall has an opening having a width that is larger than that of the lower body portion of the first card.

20. A card connector according to claim 17, wherein the upper wall has a recess adjacent to the first space having a width that is larger than that of the lower body portion of the first card.

21. A card connector according to claim 1, wherein plural grooves are formed in the base plate of the connector, and the base portions of the contact terminals are placed in the grooves.

22. An electronic device comprising:
  a circuit board, and
  a card connector mounted on the circuit board, operable to hold either of first and second cards, the first card having an upper body portion, a lower body portion, recessed portions formed on a bottom surface of the first card and separated from each other by a partition wall, and contact pads provided in the recessed positions, the second card having a card body portion having a size substantially the same as a size of the upper body portion of the first card, and contact pads arranged on a bottom surface of the card body portion, the card connector including a connector housing having an upper wall and side leg portions adjacent to both ends of the upper wall, each side leg portion including first and second side walls and a lower wall formed between the first and second side walls, a base plate adjacent to the side leg portions, the base plate being opposite the upper wall, contact terminals arranged on the base plate, at an interval of space capable of accommodating the partition wall of the first card, each of the contact terminals having a base portion and an elastic deformation portion which elastically deforms to electrically couple with the contact pads arranged on the first and second cards, a first space defined by the upper wall, the first side walls and the lower walls to hold side edge portions of the upper body portion of the first card and the body portion of the second card and to accommodate the upper body portion of the first card and the body portion of the second card, and a second space defined by the second side walls, to accommodate the lower body portion of the first card, the second space being located between the first space and the base plate, wherein the base portion of the contact terminal is placed in the base plate, the elastic deformation portion of the contact terminal extends through the second space into the first space, and no portion of the base plate extends into the second space.

23. An electronic device according to claim 22, wherein the second side walls of the side leg portions are operable to guide side surfaces of the lower body portion of the first card.

24. An electronic device according to claim 22, further comprising:

an eject mechanism to eject the first or second card; and an elastic braking piece arranged at such a position that the bottom surface of the upper body portion of the first card presses the elastic braking piece when the first card is inserted and the bottom surface of the card body portion of the second card presses the elastic braking piece when the second card is inserted, the braking piece applying a braking force to the first or second card when the first or second card is ejected.

25. An electronic device according to claim 24, wherein the elastic braking piece is secured to a position that is in a far part of one of the pair of guide grooves formed by the upper wall, the first side walls, and the lower walls and that is lower than the second side wall adjacent to the one of the pair of the guide grooves.

26. An electronic device according to claim 22, wherein the upper wall has an opening having a width that is larger than that of the lower body portion of the first card.

27. An electronic device according to claim 22, wherein the upper wall has a recess adjacent to the first space having a width that is larger than that of the lower body portion of the first card.

28. An electronic device according to claim 22, further comprising:

an elastic braking piece arranged at such a position that the bottom surface of the upper body portion of the first card presses the elastic braking piece when the first card is inserted and that the bottom surface of the card body portion of the second card presses the elastic braking piece when the second card is inserted, the braking piece applying a braking force to the first or second card in a card extraction.

29. An electronic device according to claim 28, wherein the elastic braking piece is secured to a position that is in a far part of one of a pair of guide grooves formed by the upper wall, the first side walls, and the lower walls and that is lower than the second side wall adjacent to the one of the pair of the guide grooves.

30. An electronic device according to claim 28, wherein the upper wall has an opening having a width that is larger than that of the lower body portion of the first card.

31. An electronic device according to claim 28, wherein the upper wall has a recess adjacent to the first space having a width that is larger than that of the lower body portion of the first card.

* * * * *